Sept. 10, 1963 S. KRIZMAN 3,103,370
FRONT WHEEL SUSPENSION

Filed April 18, 1962 2 Sheets-Sheet 1

INVENTOR.
STEVE KRIZMAN
BY
*Hobbs & Easton*
ATTORNEYS

Sept. 10, 1963   S. KRIZMAN   3,103,370
FRONT WHEEL SUSPENSION
Filed April 18, 1962   2 Sheets-Sheet 2

INVENTOR.
STEVE KRIZMAN
BY Hobbs & Caston
ATTORNEYS

10

United States Patent Office 3,103,370
Patented Sept. 10, 1963

3,103,370
FRONT WHEEL SUSPENSION
Steve Krizman, South Bend, Ind., assignor to Krizman Manufacturing Co., Inc., South Bend, Ind., a corporation of Indiana
Filed Apr. 18, 1962, Ser. No. 188,380
3 Claims. (Cl. 280—96.1)

The present invention relates to a front wheel suspension for automobiles and more particularly to a structure for adjusting the camber of independent type front wheel suspensions of an automobile.

In a number of present day automobiles equipped with independent front wheel suspensions having upper and lower control arms, as the front axle or cross member begins to sag, the camber becomes maladjusted resulting in the upper side of the wheel tilting inwardly causing uneven wear on the tire and difficulty in steering. Normally, the camber of the wheel is adjusted by the use of shims which set the upper control arm outwardly a slight degree to compensate for the inward tilting of the wheel. This method of adjusting the camber is satisfactory during the initial stages of wear of the ball joints in the front wheel suspension; however, the amount of adjustment which can be satisfactorily made by this method is limited to the extent that replacement of several parts, including the ball joints, becomes necessary before the full life of the parts has been realized. This involves a rather expensive service and replacement part expense and frequently must be repeated again before the full life of the new parts is obtained. In view of the relatively heavy expense involved in correcting the camber when excess wear has occurred, the difficulty is often left uncorrected, thus producing excessive wear on the front tires and substantial interference with the normal ease in steering. It is therefore one of the primary objects of the present invention to provide a relatively simple method of adjusting the camber of the front wheels of an automobile, utilizing as part thereof the original bushings normally used in making the camber adjustment during the initial stages of wear.

Another object of the present invention is to provide a relatively simple and effective method of adjusting the camber of automobile front wheels, which involves no additional parts over and above those normally used in making such an adjustment, and which does not require any change in the structure of the front wheel suspension.

Still another object of the present invention is to provide a novel ball joint construction which can be readily incorporated in a front wheel suspension of standard automobiles with little or no additional changes being made in the suspension during the installation operation and which corrects the basic defect in camber adjustment resulting from excessive wear of the ball joint.

A further object of the present invention is to provide a relatively simple, reliable ball joint construction which embodies the features necessary to accomplish the foregoing primary objectives and which can be easily fabricated and installed without the use of special equipment, tools or special skills.

Another object of the present invention is to provide an integral unit ball joint construction for use in correcting camber adjustment difficulties in front wheel suspension, which can be easily installed in place of the original ball joint and which involves an effective means for correcting the camber of the wheel even though excessive wear may have taken place in the joints and parts comprising the front wheel suspension.

Additional objects and advantages of the present invention will become apparent from the following description and accompanying drawings, wherein.

Figure 1:
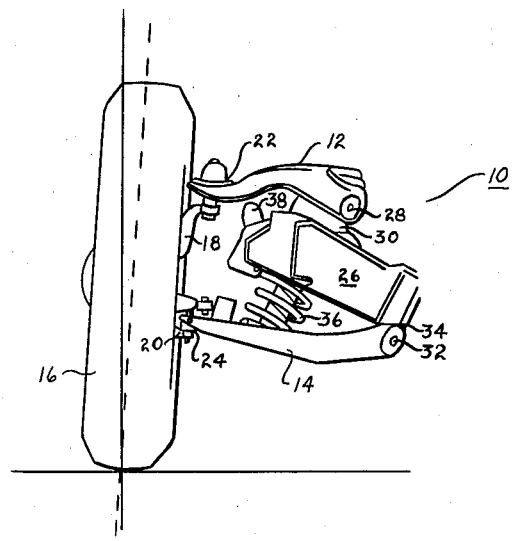
FIGURE 1 is a front elevational view of the right front wheel suspension of a standard automobile, showing the suspension before the present camber correcting mechanism has been incorporated therein and before an adjustment has been made to correct the camber.

Referring more specifically to the drawings, numeral 10 designates generally the front wheel suspension of the independent wheel type, consisting of upper A member 12, lower A member 14, front wheel 16, support members 18 and 20 connected, respectively, to upper A member 12 and lower A member 14 by ball joints 22 and 24. Upper A member 12 is pivotally connected to the axle or cross member 26 by a shaft and bushing construction 28 extending through the upper A member and an arm 30 rigidly secured to cross member 26, and lower A member 14 is pivotally secured to cross member 26 by shaft and bushing construction 32, extending through the lower A member, and an arm 34 rigidly secured to cross member 26. The spring for the front wheel suspension is shown at numeral 36 reacting between the lower front side of cross member 26 and the upper side of lower A member 14, the downward vertical movement of the A arms being limited by bumper member 38 mounted on the end of cross member 26. The construction of the independent front wheel suspension thus far described may, for the purpose of the present description, be considered as conventional in construction and operation, and hence will not be described in greater detail herein.

Figure 3:
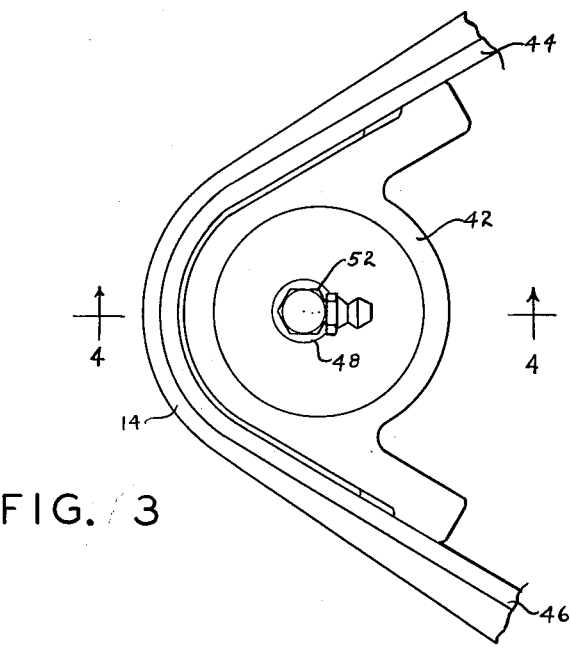
FIGURE 3 is a top plan view of the lower A member of the front wheel suspension having incorporated therein the present camber correcting mechanism.
Figure 4:
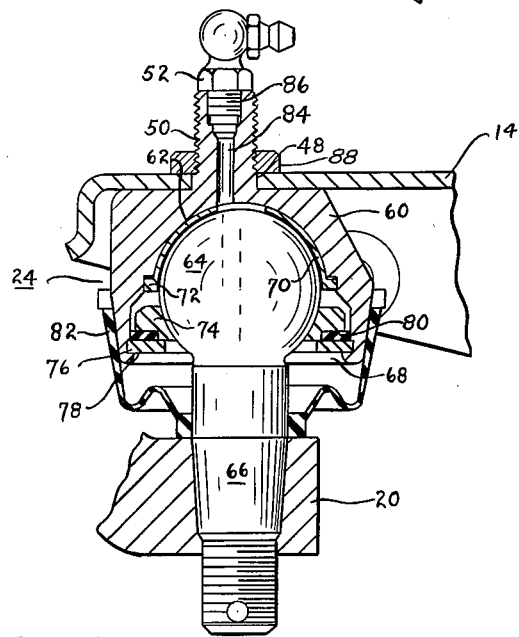
FIGURE 4 is a vertical cross sectional view of the A arm and ball joint embodying the present camber correcting mechanism, the section being taken on line 4—4 of FIGURE 3.

A camber correction mechanism is shown in detail in FIGURES 3 and 4 and consists basically of A member 14 and ball joint unit 24. The A member, the outer end of which is shown in FIGURES 3 and 4, consists of a plate member 42 supported by arms 44 and 46, connected to cross member 26 by pivot construction 32, the plate being provided with a hole 48 for receiving stem 50 of lubricating fixture 52, extending from the upper end of the ball joint 24.

The ball joint unit 24 consists of a cast metal body 60 having a hemispherically-shaped socket 62 therein for receiving a ball 64 from which a stem 66 extends downwardly through opening 68 of body 60. The ball joint preferably seats on a bearing insert 70 disposed in socket 62 and firmly seated on the inner surface of body 60, the bearing material from which the insert is made being either metal or plastic secured in place by externally extending annular flange 72 on the lower edge of the insert. The ball 64 is retained in proper operating position by a floating ring 74 which is seated on the underside of the ball and is held in place by a snap ring 76 firmly supported by an internally extending flange 78 on the lower portion of body 60. A rubber washer 80 is preferably disposed between floating ring 74 and snap ring 76 in order to permit the floating ring to effectively adjust itself to the position of ball 64 in socket 62. After the ball 64 has been seated in socket 62 and rings 74, 76 and 80 have been secured in place on the upper side of internal flange 78, the ball joint constitutes an integral unit and is preferably enclosed in a rubber sleeve 82 clamping the external surface of body 60 at its upper end and stem 66 at its lower end. Since sleeve 82 is flexible, it does not interfere with the full and free operation of the ball and stem in body 60.

Figure 2:
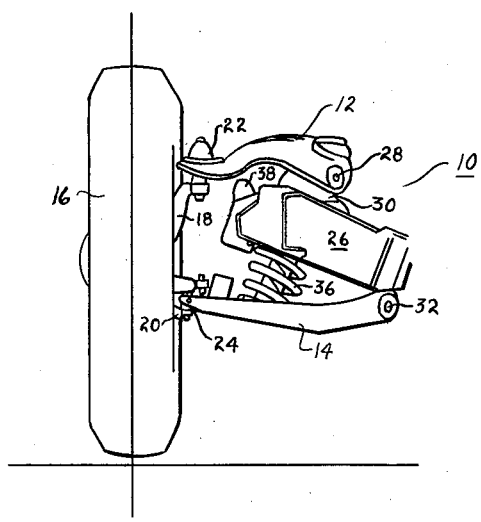
FIGURE 2 is the same front wheel suspension shown in FIGURE 1, after the present camber correcting mechanism has been incorporated in the suspension and a proper adjustment made.

One of the primary features of the present invention is the offset lubricating stem 50 and fixture 52, i.e. offset with respect to the vertical axis of ball 64 and socket 62. It can be readily observed from the center line of the ball, shown in FIGURE 4, that stem 50 is offset approximately an eighth of an inch toward the outer or free end of A member 14. Since hole 48 is the original hole in A member 14, this offset relationship of lubricating stem 50 has the effect of shifting the ball joint unit inwardly by the aforementioned one eighth of an inch, thereby shifting lower support member 20 and the lower portion of the wheel inwardly, and consequently realigning the camber so that the vertical axis of front wheel 16 shifts from the original incorrect adjusted position indicated by the broken line in FIGURE 1 to the correct vertical position indicated by the full line in FIGURES 1 and 2. Thereafter, when wear occurs in the ball joint or other parts of the front wheel suspension, such that the camber tends to return to the position shown by the broken line in FIGURE 1, adjustment shims can be readily and easily used to make the required correction. In place of the shims, other types of adjustment means may be used to make limited or fine adjustments in the camber.

The stem 50 is preferably formed integrally with body 60 and contains a center passage 84 extending downwardly therethrough and through an enlarged center opening in bearing insert 70 to permit lubricant to flow from fixture 52 to and around ball 64, the fixture preferably being secured in an enlarged bore in the upper end of stem 50 by threads 86 on the fixture. The external surface of stem 50 is threaded to receive a nut 88 for assisting in holding the ball joint unit 24 in finally installed position. After the ball joint unit has been installed in the foregoing manner and the front wheel suspension adjusted to correct the camber, the suspension and ball joint unit operate in the same manner as the original equipment, thus providing an effective camber correcting mechanism adapted to give the required correction over a wide range as the front wheel suspension and ball joint units wear during normal use of the automobile.

While only one embodiment of the present invention has been described in detail herein, various changes and modifications may be made to meet requirements.

I claim:

1. For use in connection with a front wheel suspension member, said member having a pivoted end and a free end and a vertically extending hole therein: a ball joint unit comprising a body adapted to be secured to the underside of said member and having a hemispherically-shaped downwardly facing socket therein and an opening in the lower side thereof, a hemispherically-shaped bearing insert in said socket with an enlarged lubricating hole in the center thereof, a stem secured to the upper side of said body and having a bore therein communicating with the hole in said insert, said stem being offset toward the free end of said member from the vertical axis of said socket and extending upwardly through the hole in said member with a relatively close fit therein, a lubricating fixture mounted on the upper end of said stem, a ball in said socket, a stem connected to said ball and extending through said opening, a floating ring in said opening seated against the underside of said ball, a snap ring for securing said floating ring in said opening, an annular rib on the lower portion of said body for supporting said rings, a sleeve enclosing the lower portion of said body and the upper portion of said last mentioned stem, and a nut on said first mentioned stem for securing said unit rigidly to said member.

2. For use in connection with a front wheel suspension member of an automobile, said member having a pivoted end and a free end and a vertically extending hole therein: a ball joint unit comprising a body adapted to be secured to the underside of said member and having a hemispherically-shaped dowardly facing socket therein and an opening in the lower side thereof, a hemispherically-shaped bearing insert in said socket with a lubricating hole in the center thereof, a stem secured to the upper side of said body and having a bore therein communicating with the hole in said insert, said stem being offset toward the free end of said member from the vertical axis of said socket and extending upwardly through the hole in said member with a relatively close fit therein, a lubricating fixture mounted on the upper end of said stem, a ball in said socket, a stem connected to said ball and extending through said opening, a floating ring in said opening seated against the underside of said ball, a snap ring for securing said floating ring in said opening, an annular rib on the lower portion of said body for supporting said rings, and means for securing said unit rigidly to said member.

3. For use in connection with a front wheel suspension member of an automible, said member having a pivoted end and a free end and a vertically extending hole therein: a ball joint unit comprising a body adapted to be secured to the underside of said member and having a hemispherically-shaped downwardly facing socket therein and an opening in the lower side thereof, a stem secured to the upper side of said body and having a bore therein communicating with said socket, said stem being offset toward the free end of said member from the vertical axis of said socket and extending upwardly through the hole in said member with a relatively close fit therein, a lubircating fixture mounted on the upper end of said stem, a ball in said socket, a stem connected to said ball and extending through said opening, a floating ring in said opening seated against the underside of said ball, a means for retaining said ring in said opening, and means for securing said unit rigidly to said member.

References Cited in the file of this patent

UNITED STATES PATENTS

| 2,507,108 | Lange | May 9, 1950 |
| 2,631,044 | Booth | Mar. 10, 1953 |
| 2,845,290 | Latzen | July 29, 1958 |
| 2,900,196 | Nienke | Aug. 18, 1959 |
| 2,921,809 | Kogstrom | Jan. 19, 1960 |
| 3,005,647 | Collier | Oct. 24, 1961 |

FOREIGN PATENTS

| 1,236,639 | France | June 13, 1960 |